United States Patent Office 3,356,647
Patented Dec. 5, 1967

3,356,647
CURING EPOXY RESINS WITH HYDROXY AMINO ALIPHATIC NITRILES
Walter M. Budde, Jr., Prior Lake, Minn., assignor to Ashland Oil & Refining Company, Ashland, Ky., a corporation of Kentucky
No Drawing. Filed May 18, 1966, Ser. No. 550,930
8 Claims. (Cl. 260—47)

ABSTRACT OF THE DISCLOSURE

Epoxy resins having terminal 1,2-epoxide groups are cured by mixing the same with hydroxy amino fatty nitriles, e.g., the reaction product of epoxidized aliphatic nitriles with an ethylene polyamine.

---

This is a continuation-in-part of Ser. No. 222,182, filed Sept. 7, 1962.

The present invention relates to a process of curing epoxy resins using, as curing agent, hydroxy amino aliphatic nitriles. In another aspect, this invention relates to the cured resinous products which are thereby obtained. Such products are useful as adhesives, surface coatings, castings, and the like.

In the prior art, various amines and polyamines have been used as curing agents for epoxy resins (i.e. resins having terminal epoxide groups). In their search for improved curing agents, prior workers have reacted fatty acids or fatty esters with various amines and polyamines. However, the resulting fatty-modified amines were often incompatible, in varying degrees, with certain commercially available epoxy resins. Thus, when such a prior art fatty modified polyamine was mixed with an epoxy resin (e.g. a bisphenol epichlorohydrin resin) a certain amount of stratification occurred before the heat released during curing could cause the temperature of the mixture to rise sufficiently to create a homogeneous or completely soluble mixture.

I have discovered that certain hydroxy amino aliphatic nitriles have the unusual property of being completely compatible with common epoxy resins (e.g. Epon 828) at room temperature. The practice of my invention has other advantages. For example, the cured resinous products obtained by practicing my invention have a greater flexibility when compared with the same epoxy resins which have been cured with conventional polyamine curing agents. This increase in flexibility is especially useful in such applications as electrical encapsulation, casting, laminating, surface coatings, general purpose adhesives, binders for sand in making foundry cores, and the like. Additionally, the curing agents of this invention have a relatively low viscosity which is an especially desirable feature. Consequently, these curing agents can be readily mixed with epoxy resins. Surprisingly, many closely related hydroxy amino aliphatic compounds (i.e. those hydroxy amino aliphatic compounds having functional groups on the terminal aliphatic carbon atom other than the nitrile group) do not have, to the same degree, these desirable viscosity characteristics. Still further, the curing agents of this invention are not nearly as toxic as many of the prior art polyamines which have been used as curing agents for epoxy resins.

The hydroxy amino aliphatic nitriles used in the practice of the present invention are the reaction products of epoxidized aliphatic nitriles with ethylene amines. Such reaction products have been disclosed in the prior art to be useful as plasticizers for polyvinyl resins, as sludge inhibiting additives for fuel oils, and as inhibitors against the corrosion of ferrous metals by water containing hydrogen sulfide. See, for example, U.S. 3,081,304.

The epoxidized aliphatic nitriles used in preparing the curing agents of the present invention can be prepared in a conventional manner by epoxidation (e.g. peracetic acid epoxidation) of unsaturated aliphatic nitriles. Such aliphatic nitriles can be prepared by conventional techniques from, for example, fatty acids. Typically, such nitriles are prepared from unsaturated $C_6$–$C_{26}$, e.g. $C_{10}$–$C_{22}$ fatty acids such as those fatty acids obtained from soybean oil, tall oil, safflower oil, olive oil, linseed oil, fish oils, and the like. For use in the present invention, it is preferred that the aliphatic nitriles be prepared from tall oil fatty acids, soybean oil fatty acids, or oleic acid.

The polyamines which are condensed with the aforementioned epoxidized fatty nitriles are the ethylene amines. See Encyclopedia of Chemical Technology, Kirk and Othmer, vol. 5, pp. 898–905, Interscience Publishers, New York (1950). These ethylene amines have the formula:

wherein $x$ is an integer of at least 1, usually from 1–5, inclusive. Preferably, $x$ will be at least 2 and desirably from 2–4, inclusive. If desired, mixtures of ethylene amines can be used. Such ethylene amines include ethylene diamine, diethylene triamine, tetraethylene pentamine, and the like.

The reaction between the epoxidized aliphatic nitrile and the ethylene amine is typically conducted by using an excess (e.g. 100% excess) of the ethylene amine and a suitable catalyst (e.g. $BF_3$). Other catalysts such as p-toluene sulfonic acid, ethane sulfonic acid, sulfuric acid, aluminum chloride, and the like, can be used. Typically, the amount of catalyst will be within the range of 0.5–1.0% based on the combined weight of epoxidized aliphatic nitrile and ethylene amine.

When the epoxidized aliphatic nitrile and the ethylene amine are co-reacted, an epoxy group of the epoxidized aliphatic nitrile will be split causing the formation of a hydroxyl group on one of the carbon atoms of the original epoxy group and the attachment of an amino group of the ethylene amine to the other carbon atom of the original epoxy group. Since the tri-atomic epoxy group or ring, i.e.

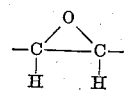

may be split on either side of the oxygen bond, the hydroxyl group (and the amino group) may be attached to either of the two carbon atoms of the original epoxy group. Accordingly, the reaction product may contain both isomeric forms of the compound illustrated below:

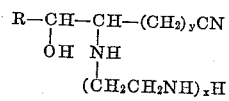

wherein R is an aliphatic group, usually a hydrocarbyl group, containing from 2–16 carbon atoms, wherein $y$ is an integer of from 2–10, inclusive, and wherein $x$ is an integer of at least 1, usually from 1–5, inclusive. The sum of the number of carbon atoms in R, plus $y$, plus 3 will usually be from 6–26, and desirably from 10–22. These hydroxy amino aliphatic nitriles will typically have viscosities (at 25% C.) within the range of less than 100 stokes, generally from 5–80 stokes and more frequently within the range of 10–50 stokes.

Both solid and liquid epoxy resins (i.e. resins having terminal epoxide groups) can be cured with the hydroxy amino aliphatic nitrile curing agents. If desired, the epoxy resins can be dissolved in suitable solvents to thereby facilitate mixing and curing. Mixtures of various kinds of epoxy resins can be used.

The preferred epoxy resins are the reaction products of epichlorohydrin and 2,2-bis(p-hydroxyphenyl)propane (i.e. Bisphenol A). Such resins are referred to as bisphenol-epichlorohydrin resins and are commercially available under such trademarks as "Epon 1001." These resins have the following indealized structure:

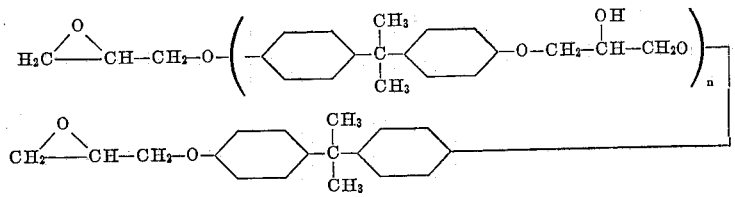

where $n$ is 0 or an integer up to 10. Generally speaking, $n$ will be no greater than 2 or 3, and is often 1 or less.

Another epoxy resin is the reaction product of epichlorohydrin and bis(p-hydroxyphenol)sulfone.

Still another group of epoxy resins are the glycidyl esters of polymerized fatty acids. These glycidyl esters are obtained by reacting polymeric fatty acids with polyfunctional halohydrins such as epichlorohydrins. Since the common polymeric fatty acids are predominantly composed of dimeric fatty acids, the glycidyl esters thereof may be represented as follows:

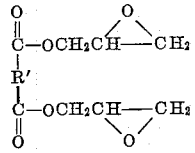

wherein $R'$ is a divalent hydrocarbon radical of a dimerized unsaturated fatty acid, e.g. dimerized oleic acid.

The epoxy novolac resins can also be used. The novolac resins, as is known in the art, are produced by condensing a phenol with an aldehyde in the presence of an acid catalyst. Although novolac resins from formaldehyde are generally employed, novolac resins from other aldehydes such as acetaldehyde, chloral, butyraldehyde, furfural, and the like may also be used. The alkyl groups, if present, may be straight or branched chain. Illustrative of the phenols from which the novolac resins can be prepared are phenol, cresol, butylphenol, t-butylphenol, t-amylphenol, hexylphenol, 2-ethylhexylphenol, nonylphenol, decylphenol, dodecylphenol, and the like. It is generally preferred, but not essential, that the alkyl substituent on the phenol be in the para position (with respect to the phenolic hydroxyl group). However, novolac resins in which the alkyl group is in the ortho position have been prepared. The epoxy novolac resins can be formed (as is known in the art) by admixing a novolac resin with epichlorohydrin and then adding an alkali metal hydroxide to the mixture so as to effect the desired condensation reaction.

These resins can be represented by the following structural formula:

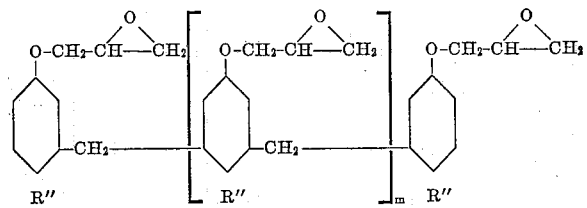

wherein $R''$ is selected from the group consisting of hydrogen and $C_1$–$C_{18}$ alkyl groups and wherein $m$ is an integer from 0 to 15 or more, e.g. from 1–10.

In addition, other epoxy resins having terminal epoxide groups can be cured with the curing agents of the present invention (e.g. epoxidized olefins such as epoxidized polybutadiene).

These various epoxy resins, all having terminal epoxide groups can be described by such terms as molecular weight, epoxy equivalency, epoxide equivalent weight, and/or hydroxyl functionality.

Epoxy resins having an average molecular weight of from as low as 200 up to 5000 or more can be used. More frequently, the molecular weight will be from 250 to 4000. For certain applications (e.g. castings) epoxy resins having a molecular weight of 500–1500, e.g. 600–1000 will be useful. However, for other applications such as adhesives and certain coatings, the lower molecular weight epoxy resins (e.g. 250–500 molecular weight) will be better suited.

Hydroxyl functionality is defined as the average number of hydroxyl groups in a single epoxy resin molecule. Optionally, the same numerical values can be thought of as expressing the number of moles of (—OH) per mole of resin. Bisphenol-epichlorohydrin resins having hydroxyl functionalities of 3 to 10, e.g. 4 to 8 are quite useful.

Epoxy equivalency is defined as the average number of epoxide groups per molecule of epoxy resin. Epoxy equivalency values of at least 1.4, and preferably at least 1.8, e.g. about 2 are especially desirable.

Of all of the various characterizing terms, epoxide equivalent weight is the most commonly used. The epoxide equivalent weight is defined as the number of grams of epoxy resin which contain one gram equivalent of epoxide. Thus, an epoxy resin having a molecular weight of 1000 and an epoxy equivalency of 2 would have an epoxide equivalent weight of 500. The epoxy resins used in the practice of this invention will typically have epoxide equivalent weights of 100–4000, more usually from 140 to 2000, e.g. 150–1000.

In practicing the present invention, a sufficient amount of a hydroxy amino aliphatic nitrile will be mixed with an epoxy resin to obtain the desired rate of cure. Obviously, the amount of curing agent to be employed will be a function of the desired rate of cure, the temperature of cure, and the amount of time available for curing. Typically, the curing agents of the present invention and an epoxy resin will be mixed in a ratio of 25–130 parts (e.g. 30–100 parts) by weight of curing agent to 100 parts by weight of epoxy resin. However, circumstances may dictate the use of more than 130 parts or less than 25 parts of curing agent per 100 parts by weight of epoxy resin. Curing is accomplished by simply mixing the curing agent and epoxy resin and allowing the mixture to react under ambient conditions or at elevated temperatures. Typically, curing will be effected at temperatures ranging from about 20° C. up to 250° C. or higher, e.g. 25° C. to 200° C. Although solvents can be used in conjunction with the curing agents, I prefer to employ the curing agents in the absence of a solvent. This feature represents another advantage of my invention.

The present invention will be further understood by reference to the following specific examples which include a preferred embodiment. Unless otherwise indicated, all parts and percentages are by weight.

*Example I*

A curing agent was prepared by charging 1270 parts of triethylene tetramine and 38.5 parts of BF₃ etherate (of which 48% was BF₃) to a flask equipped with a stirrer, heating mantle, thermometer, and reflux condenser. The contents of the flask were heated to 265° F. Then, 1100 parts of epoxidized tall nitrile were added to the contents of the flask over a 30-minute interval. This epoxidized tall nitrile had been prepared from tall oil fatty acids and had an oxirane value of 5.36% at an iodine value of 8.2. During the addition of the epoxidized tall nitrile, the temperature was raised to 280° F. After addition of the epoxidized tall nitrile had been completed, the heating was continued at 280°–285° F. for an additional 90 minutes. The temperature was then increased to 348° F. Vacuum was applied to the flask and unreacted triethylene tetramine was stripped from the reaction mixture. The product of this reaction was a hydroxy amino fatty nitrile having a viscosity of approximately 19 stokes.

Four different mixtures of epoxy resin and curing agent were prepared using the curing agent just prepared. The epoxy resin used was a liquid bisphenol epichlorohydrin resin (Epon 828; a product of Shell Chemical Corp.) having terminal epoxy groups and an epoxide equivalent weight of about 200. These four samples were thoroughly mixed and 25 gram portions of each were placed in separate aluminum weighing dishes and heated at 150° F. for 45 minutes to thereby effect a cure. The heated samples were then allowed to cool overnight. The composition of these samples and the results obtained are summarized in Table I which follows:

TABLE I
[Effect of Weight Ratio of Curing Agent to Epoxy Resin]

| Parts of Curing Agent per 100 parts Epoxy Resin | Barcol Hardness | Remarks |
|---|---|---|
| 25 | 0 | Light colored soft plastic. |
| 50 | 18–20 | Amber colored hard tough plastic. |
| 100 | 8–10 | Amber colored hard plastic. |
| 130 | 2–3 | Dark amber colored plastic. |

The data in Table I show that the hardest resinous products were obtained when approximately 50 parts of the curing agent were mixed with 100 parts of epoxy resin.

*Example II*

70 parts by weight of bisphenol epichlorohydrin resin (Epon 828) and 30 parts by weight of the hydroxy amino fatty nitrile of Example I were thoroughly mixed and reduced to 90% non-volatile (i.e. 10% solvent) with a 1:1 mixture of methyl isobutyl ketone and Cellosolve. After aging for one hour, the viscosity of this mixture was 23.3 stokes. Three mil wet films, drawn on glass, set to touch in four hours at room temperature. After seven hours in a constant temperature (25° C.), constant humidity (50% relative) room, the films had cured sufficiently to pass the 500 gram Zapon test.

*Example III*

A hydroxy amino fatty nitrile was prepared by reacting triethylene tetramine with an epoxidized fatty nitrile prepared from linseed oil fatty acids. $BF_3$ was used as the catalyst in preparing this curing agent.

40 parts of this hydroxy amino fatty nitrile at 50% non-volatile in 95% ethanol were mixed with 100 parts by weight of epoxy resin (Epon 828) at 50% non-volatile in 95% ethanol. The resulting mixture was drawn to form a three mil wet film on plate glass. After drying for 3¾ hours at room temperature, this film had cured sufficiently to pass the 500 gram Zapon test. The Sward hardness of this film was 22 after 24 hours. At the end of a total elapsed time of two weeks, the Sward hardness had increased to 38. The cured film showed no signs of becoming brittle.

*Example IV*

A number of short steel strips one (1) inch wide were sand blasted and cleaned with solvent. Laminates were then made from pairs of these strips in such a manner as to createm one (1) inch square glued joints.

The adhesive employed in making these laminates was a mixture of 100 parts of epoxy resin (Epon 828) and 50 parts by weight of the hydroxy amino fatty nitrile of Example I. To ensure a good bond, uniform pressure was exerted on the strips at the joint so that the thickness of the adhesive between the strips was equal in all parts of the one (1) inch square joint.

For purposes of comparison, other laminates were prepared under identical conditions using, as the adhesive, a mixture of 100 parts by weight of bisphenol epichlorohydrin resin (Epon 828) and 8 parts by weight of diethylene triamine. This mixture was used because it was a recommended and accepted industrial method for curing the particular epoxy resin being used. In this instance, the pressure exerted on the joint was the same as that employed in the other laminates and the thickness of the adhesive was the same.

The laminates (i.e. those of this example and the comparative laminates) were then aged for seven days at 77° F. under a relative humidity of 50%. For convenience in testing, the laminates were divided into two groups. The following lap shear strengths were then obtained.

TABLE II

| Curing Agent | Average Lap Shear Strength (p.s.i.), Laminates of— | |
|---|---|---|
| | Group No. 1 | Group No. 2 |
| Diethylene triamine | 575 | 523 |
| Hydroxy amino fatty nitrile | 653 | 885 |

The data of Table II show that the use of the curing agent of the present invention improved the lap shear strength when compared with a prior art curing agent. Additionally, the curing agent of the present invention is not as toxic as the prior art curing agent used for comparative purposes.

*Example V*

900 parts of diethylene triamine and 15.6 parts of $BF_3$ gas were charged to a flask as in Example I, and heated to 280° F. 1100 parts of epoxidized oleyl nitrile, having 5.36% oxirane at an iodine value of 3.65, were then added over a 40-minute period. The temperature was maintained at 280° to 290° F. for an additional two hours. Next, the temperature was increased to 345° F. and a full vacuum applied to thereby strip off any unreacted diethylene triamine. The viscosity of this oleyl nitrile modified polyamine was 5 stokes.

A mixture of 3.6 parts of the curing agent just prepared, 7.4 parts of bisphenol epichlorohydrin resin (Epon 828) and 55 parts of coarse sand were mixed. Then, 2.75 parts $TiO_2$ and 0.22 part of carbon black were admixed with the first mixture. The resulting mixture was then applied with a trowel to a 40 square foot section of a laboratory floor. After curing overnight under ambient conditions, a very durable coating was obtained. This coating successfully withstood extremely heavy wear and direct exposure to paint and lacquer solvents.

From the foregoing examples and description, it can be appreciated that the hydroxy amino aliphatic nitriles disclosed herein are highly effective curing agents for epoxy resins. These results are even more surprising when one compares the results obtained herein with the results obtained by using closely related products as curing agents. For example, when epoxidized oleyl alcohol is condensed with triethylene tetramine and used according to the teachings of the present invention, it is not nearly as compatible with bisphenol epichlorohydrin resins as is the corresponding product derived from epoxidized oleyl nitrile. Likewise, poor compatibility is obtained when a curing agent is prepared from the corresponding epoxidized fatty amines. Still further, curing agents prepared by reacting acrylonitrile and diethylene triamine are not as effective curing agents for bisphenol epichlorohydrin resins as, for example, a curing agent of the present invention prepared from epoxidized tall oil nitrile and diethylene triamine.

Although the present invention has been described with a certain degree of particularity, it will be appreciated that numerous minor changes and variations falling within the spirit and scope of the invention will be obvious to one routinely skilled in this art.

What is claimed is:

1. In a process for curing epoxy resins having terminal 1,2-epoxide groups wherein curing agent is mixed with said resin to thereby cure said resin, the improvement which comprises using as curing agent a hydroxy amino fatty nitrile having the formula:

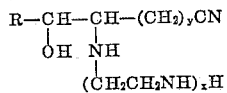

wherein R is an aliphatic group containing 2–16 carbon atoms, wherein $y$ is an integer from 2–10, and wherein $x$ is an integer of at least 1.

2. The process of claim 1 wherein said epoxy resin is a bisphenol epichlorohydrin resin having an epoxide equivalent weight of 140–2000; wherein the sum of the number of carbon atoms in R, plus $y$, plus 3 is from 10–22; and wherein $x$ is at least 2.

3. The process of claim 2 wherein from 25–130 parts of curing agent are used per 100 parts by weight of epoxy resin; wherein the epoxy resin is a normally liquid epoxy resin; and wherein $x$ is from 2–4 inclusive.

4. The process of claim 3 wherein said hydroxy amino aliphatic nitrile is the condensation product of epoxidized tall nitrile and triethylene tetramine.

5. The process of claim 3 wherein said hydroxy amino aliphatic nitrile comprises the condensation product of epoxidized oleyl nitrile and diethylene triamine.

6. The process of claim 3 wherein said hydroxy amino aliphatic nitrile is the condensation product of epoxidized linseed nitrile and triethylene tetramine.

7. The process of claim 1 wherein said epoxy resin has an average molecular weight of from 500–1500, a hydroxyl functionality of from 3–10, and an epoxy equivalency of at least 1.4.

8. The cured product obtained by the improved process of claim 1.

References Cited

UNITED STATES PATENTS 3,081,304  3/1963  Rogier _____ 260—247.7

WILLIAM H. SHORT, *Primary Examiner.*

T. D. KERWIN, *Assistant Examiner.*